(No Model.)

S. HARRIS.
RATCHET DRILL.

No. 371,452.          Patented Oct. 11, 1887.

Witnesses:
Charles S. Harris
Chas. Zimmerman.

Inventor:
Samuel Harris

UNITED STATES PATENT OFFICE.

SAMUEL HARRIS, OF CHICAGO, ILLINOIS.

RATCHET-DRILL.

SPECIFICATION forming part of Letters Patent No. 371,452, dated October 11, 1887.

Application filed April 30, 1887. Serial No. 236,714. (No model.)

*To all whom it may concern:*

Be it known that I, SAMUEL HARRIS, a citizen of the United States, residing at Chicago, Cook county, State of Illinois, have invented a new and useful Ratchet-Drill, of which the following is a specification.

Figure 1:
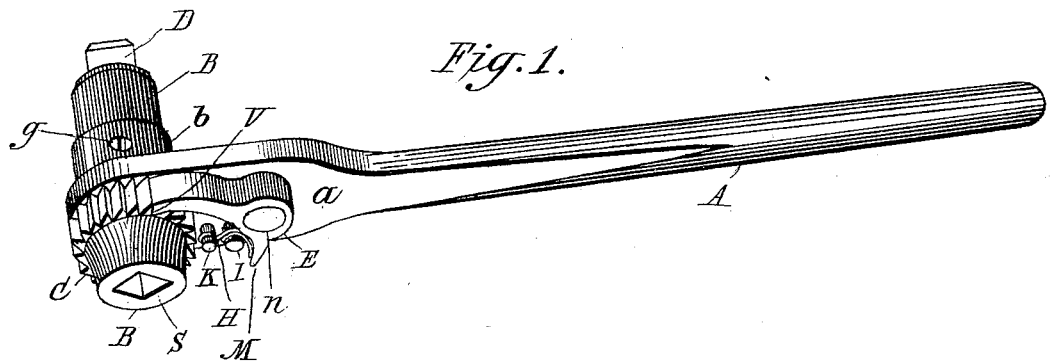
Figure 2:
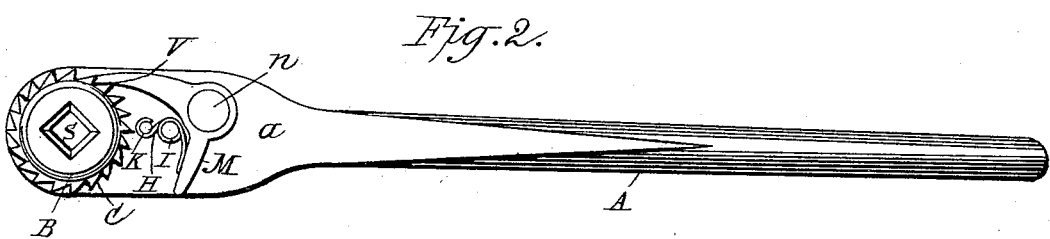
Figure 3:
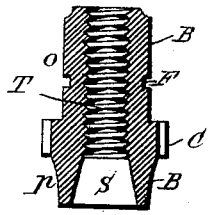

Figure 1 is a perspective view of the ratchet-drill. Fig. 2 is a bottom view showing the positions of the ratchet-wheel and pawl together with the spring which holds the pawl in contact with the ratchet-wheel. Fig. 3 is a vertical sectional view of the ratchet-wheel and spindle.

Same letters refer to same parts in each view.

The ratchet-drill is made and constructed substantially in the manner following:

A is the handle, about twelve inches long from center of spindle B, and about three-fourths of an inch in diameter. The handle is made wider, as shown in Fig. 2, for about four inches from the end to which the ratchet is attached, as shown at $a$. It is also made about one-half inch in thickness, as shown in Fig. 1 at $a\ a$.

$b$ is a boss about one and one-half inch in diameter and about one and one-fourth inch in height, attached to and made part of the handle A, and is for the purpose of giving sufficient length of bearing for spindle B. The spindle B and ratchet-wheel $c$, with its teeth, are cast of some suitable metal in one piece. The spindle B, as shown at $o$, is about one inch in diameter, and its length above the ratchet-wheel is about three and one-half inches. The ratchet wheel C is about two inches in diameter, and about one-half inch in depth of teeth. The spindle B, as shown at $p$, below the ratchet-wheel C, is about one and one-half inch in diameter, and three-fourths of an inch long. The spindle B has a taper square hole cast in the lower end, as shown at S in Figs. 2 and 3, for the purpose of holding the drills. The core also extends through to the top of spindle B, and makes a round hole in spindle, as shown at T, which is tapped out to admit feed-screw D.

F is a groove turned in spindle B, into which the end of screw $g$ projects, to prevent the spindle from falling out. The screw $g$ is screwed into boss $b$.

E is a pawl fastened in its proper position by means of stud or rivet $n$, on which it can swing. The pawl E connects with the ratchet wheel C at V. The pawl E has a short arm, (shown at M.)

H is a spring, of spiral or other form, which is held in its proper position by means of studs or rivets I and K or by other suitable means. The spring H acting on arm M holds the pawl in contact with ratchet-wheel at V.

Other sizes can be made, keeping about the same proportions as above described.

Having thus described my invention, what I claim as new, and desire to secure by Letters Patent, is—

The improved ratchet-drill, consisting of the flattened handle A, having the hollow boss $b$, and provided with the screw $g$ and the spring-actuated pawl E, the ratchet-wheel C, integral with the screw-threaded spindle B, provided with the socket S and groove F, and the feed-screw D, constructed and combined as hereinbefore described.

SAMUEL HARRIS.

Witnesses:
 JOSEPH H. EASTER,
 CHARLES S. HARRIS.